June 11, 1935.  C. G. WEHRLY  2,004,386
APPARATUS FOR LUBRICATING TROLLEYS
Filed March 23, 1931  2 Sheets-Sheet 1

INVENTOR
Clarence G. Wehrly
BY
ATTORNEY

June 11, 1935.                C. G. WEHRLY                2,004,386
                     APPARATUS FOR LUBRICATING TROLLEYS
                           Filed March 23, 1931           2 Sheets-Sheet 2
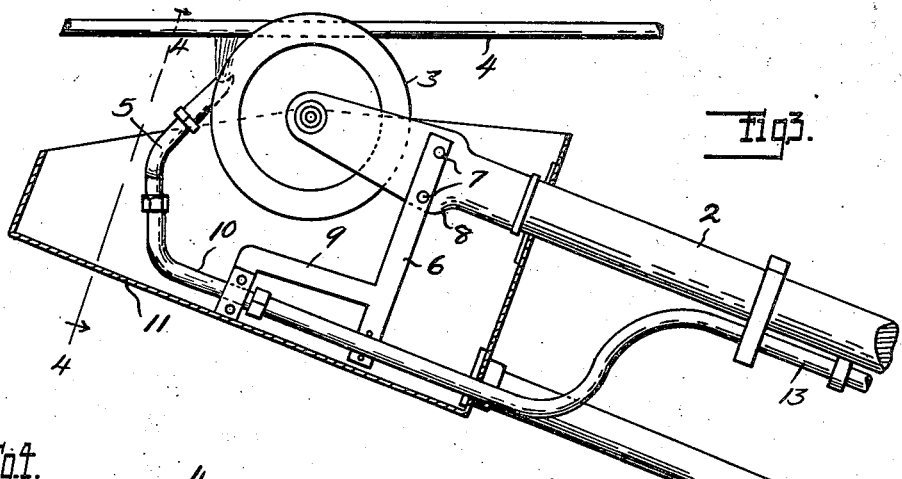
Fig. 3.
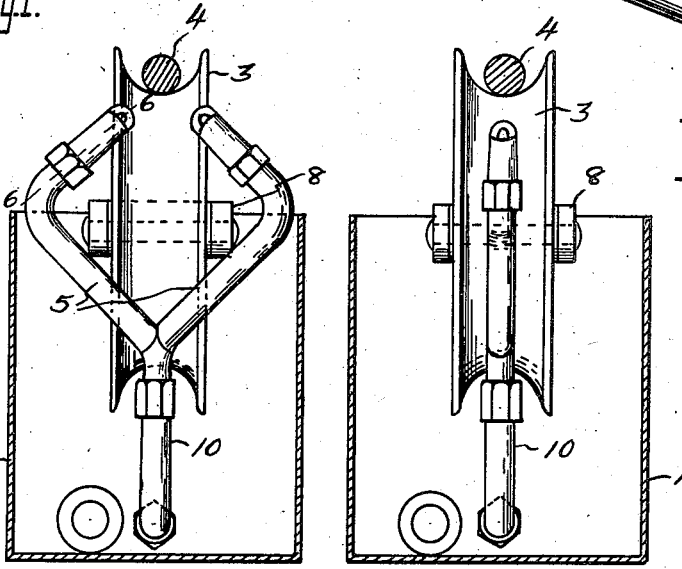
Fig. 4.                                    Fig. 5.
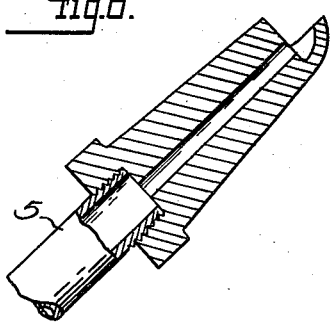
Fig. 6.
INVENTOR
Clarence G. Wehrly
BY
ATTORNEY Patented June 11, 1935

2,004,386

UNITED STATES PATENT OFFICE 2,004,386

APPARATUS FOR LUBRICATING TROLLEYS

Clarence G. Wehrly, Detroit, Mich.

Application March 23, 1931, Serial No. 524,636

6 Claims. (Cl. 184—15)

This invention relates to methods and apparatus for lubricating trolley wires, cables, and rails.

It has long been recognized that such lubrication is an essential factor in minimizing wear of wires, cables, and rails and improving trolley service, particularly in electric railway operation, but serious difficulties have been encountered in attempting such lubrication. Oils and greases have proven quite unsatisfactory for the purpose, primarily because of their insulating nature, their tendency to collect dust and grit, and their failure to lend themselves to quick, clean, and inexpensive methods of application.

It has also been recognized that graphite is a lubricant of a non-insulating nature, but there has heretofore been lacking a practical method or apparatus for establishing a lasting adhesion of graphite to a trolley wire, cable, or rail.

An object of the present invention is to provide a comparatively inexpensive and expeditious method and apparatus for so applying graphite to a trolley wire, cable, or rail as to maintain its adhesion to the latter over an extended period of time.

More specifically, it is an object of the invention to apply graphite to a wire, cable, or rail by suspending the graphite in a finely divided form and in association with a suitable binder or filler in water or other suitable liquid, and spraying it in that form upon a metallic tread surface under such impact as to inject the fine graphite particles into the pores or interstices of the metal, whereby a secure and lasting adhesion is effected.

Another object is to provide an apparatus for practicing said method, adapted to accurately direct the lubricating spray against the tread surface of a wire, cable, or rail, and comprising a pan for catching excess lubricant and returning same to a source of supply.

A further object is to provide upon a car or other suitable carrier a storage reservoir for a lubricant suspended in liquid, and to connect said reservoir to a nozzle associated with a contact maker carried by said car or carrier and engaging a current-supplying trolley wire or rail, or a tramway cable, and to maintain a pressure upon the contents of said reservoir such as to deliver the suspended lubricant from said nozzle under an impact adequate to inject the lubricant into minute pores or interstices of the wire, cable or rail.

A still further object is to effect in a simple manner such an agitation of the lubricant-suspending liquid as to maintain a substantially uniform distribution of the graphite particles throughout the liquid.

These and various other objects the invention attains by the construction hereinafter described and illustrated in the accompanying drawings, wherein:

Fig. 3 is a vertical sectional view of a lubricant supply nozzle and associated drip pan, carried by the trolley pole of said car adjacent to the contact maker thereof.

Fig. 4 is a vertical, cross sectional view of the same, taken upon the line 4—4 of Fig. 3.

Fig. 5 is a view similar to Fig. 4, but showing an alternative type of nozzle.

Fig. 6 is an axial, sectional detail of one of the nozzles, taken upon the line 6—6 of Fig. 4.

Figures 1, 2:
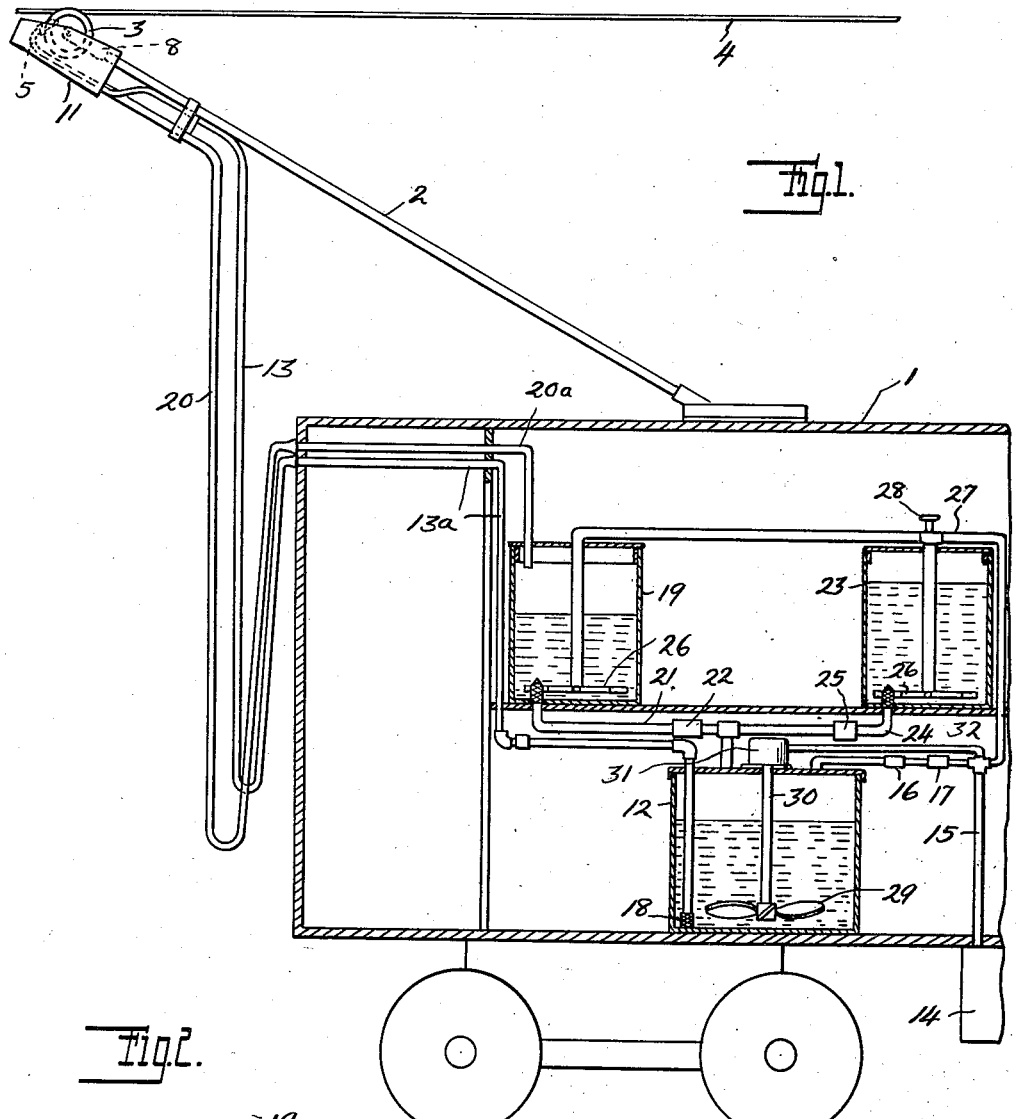
Fig. 1 is a diagrammatic, sectional elevational view of a railway car, equipped with the herein-disclosed lubricating apparatus.
Fig. 2 is a horizontal sectional view of one of the lubricant tanks, showing a provision for creating a multiplicity of air jets in said tank to maintain suspension of lubricant.

In these views, the reference character 1 designates a trolley car (either of a track or trackless type), equipped with the usual pole 2 and contact maker 3 to collect current from an overhead wire 4. The contact maker, as illustrated, is a grooved wheel, but the invention may be equally well applied in connection with a shoe or slide, or other form of contact.

Behind the trolley wheel and beneath the wire 4 is positioned a lubricant discharge fitting 5, which may be variously constructed, but, as shown in Fig. 4, comprises two slightly spaced nozzles, one at each side of the vertical plane of the wire, and having their axes of discharge substantially intersecting the axis of the wire, said nozzles forming angles of substantially 45 degrees with said plane and being similarly inclined in the direction of travel of the wheel at about 45 degrees to the horizontal plane of the wire.

The described position of the outlet fitting 5 may be variously maintained, the illustrated provision for that purpose being a bracket 6, rigidly secured, as indicated at 7, to the trolley harp 8 and depending therefrom, and formed with a projecting arm 9, to which is clamped a pipe 10 carrying said fitting. It is preferred to dispose the bracket 6 within an open-topped sheet metal pan 11, underlying the outlet fitting, trolley wheel and harp, and suitably secured to the trolley pole. As shown, an end wall of the pan 11 engages the pole, closely adjacent to the harp, and the lower ends of the bracket 6 and its arm 9 are rigidly secured to the pan bottom.

The car 1 carries a tank 12 from which a lubricant may be delivered, under predetermined pressure, to the fitting 5 through a flexible hose 13 and pipe 13a. The nature of the lubricant employed and the manner of its delivery to the trolley wire, cable or rail are very essential features of the invention.

The preferred lubricant is graphite in finely divided form suspended, together with a certain proportion of fuller's earth (also finely divided) in water or other suitable liquid. Such suspension is essential to permit an accurate control of the rate of delivery of the lubricant, to facilitate recovery of excess lubricating mixture at the point of delivery, and to prevent such fouling of the atmosphere as would necessarily result by dry delivery of the powdered graphite to the wire. The degree of concentration of the graphite in the liquid is susceptible of considerable variation, according to the quality of graphite employed, satisfactory results being ordinarily obtainable in the ratio of three ounces of graphite to one gallon of water. The function of the fuller's earth is that of a binder and filler, in that it greatly increases and prolongs adhesion of the graphite to the sprayed surface. In the absence of such an ingredient, adequate adhesion of a non-viscuous lubricant has not been found obtainable, even under the impact derived from a spray application. It is to be noted, however, that various substances may serve as a binder or filler, the fuller's earth exemplifying a light, inexpensive and non-gritty material for the purpose, readily obtainable in finely divided form.

Maintenance and regulation of delivery pressure upon the suspended lubricant may be variously accomplished, but it has been found convenient and relatively inexpensive to maintain an air compression in the tank 12, particularly since a compressed air reservoir 14 is standard for almost all cars equipped with trolleys or the like. Thus, as shown in Fig. 1, a pipe 15 leading from an air reservoir 14, and controlled by any suitable shut off valve 16, opens into the top portion of the tank 12, being equipped with any well known type of automatic pressure-reducing regulator 17. The lubricant delivery pipe 13a preferably has its inlet closely adjacent to the bottom of the tank 12, and may be suitably screened, as indicated at 18.

Pressure in the tank 12 prohibits continuous return to the latter of the excess lubricant caught by the pan 11, and therefore, a second tank 19 is installed preferably at a level above the tank 12, and has a drain connection thereto from the pan 11 established by a flexible hose 20 and pipe 20a. To discharge the contents of the tank 19 into the tank 12, air pressure in the latter is relieved and a flow established through a pipe connection 21 by opening a valve 22.

It is evident that volume of the mixture stored in the described circulating system must gradually diminish, in use of the apparatus, by adhesion to the wire and dissipation to atmosphere. Occasional replenishment of said mixture is therefore necessary. Accordingly, there is installed in the car I a third tank 23, receiving a reserve supply of suspended lubricant for occasional delivery to the tank 12. Preferably, the tank 23 is at a level above the tank 12 and has a delivery connection to the latter through a pipe 24, controlled by a suitable valve 25.

To maintain complete and uniform suspension of the lubricant and binder or filler, it is desirable during use of the apparatus to agitate the contents of the three tanks. In the tanks 19 and 23, such agitation may be conveniently maintained by air jets. Thus a jet head, such as is exemplified at 26 is provided in each of said tanks, adjacent to the bottom thereof, each having a multiplicity of small downwardly opening vents, from which air impinges upon substantially the entire bottom surfaces of the tanks. As best shown in Fig. 2, the heads 26 may comprise a system of radial pipes communicating axially of the tanks with air delivery pipes 27 leading from a common control valve 28 to which air is supplied from the reservoir 14.

Because of the considerable air pressure maintained in the tank 12, employment of air jets to agitate the contents thereof is not easily feasible, and it is preferred to install in the bottom portion of said tank a rotary agitator 29 driven by a shaft 30 from a motor 31 surmounting said tank. Said motor is of any suitable type, and as illustrated, employs as its energizing fluid, air supplied from the reservoir 14 through a pipe 32.

In use of the described apparatus, the car I is driven (preferably at moderate speed) beneath (or in other suitable proximity to) the trolley wire to be lubricated. The three agitators being energized and suitable air pressure being established in the tank 12, the contents thereof are delivered through the pipe 13a and hose 13 to the outlet fitting 5. From the latter the lubricating mixture is discharged against the under face of the wire with sufficient impact to inject its solid particles into the pores or interstices of the metal. Owing to close proximity of the jet nozzles to the wire, the desired impact is achieved with a quite moderate velocity of delivery, this being desirable to minimize rebound of the mixture and resultant dissipation thereof to atmosphere.

The major portion of the excess mixture falls or splashes back into the pan 11, whence it flows by gravity to the tank 19. Upon a sufficient accumulation in said tank, pressure in the tank 12 is relieved, and contents of the tank 19 are transferred by gravity to the tank 12.

It has been found that the described treatment of a trolley wire will under most conditions suffice to maintain proper lubrication of said wire over a period of several weeks, the tread surface of the wire becoming smooth and glassy following its first traversal by the contact maker of a car and maintaining that condition, with very slight evidence of wear. Furthermore, this result is accomplished with no detraction from the current-transmitting properties of the wire.

As evidencing the effectiveness of lubrication by the disclosed method, it may be mentioned that its use in certain instances has reduced the monthly average of wire breakages from ninety to five, on a four hundred and fifty mile system.

It is essential to distinguish the described spray lubrication of trolley members from the mere rubbing of a lubricant on a tread surface. While rubbing methods may suffice to apply grease or oil, such methods have been found entirely unsuited for applying graphite or any other non-viscous lubricant. Delivery of such a lubricant, suspended in a liquid spray and in intimate association with a filling medium, is essential to effect a lasting adhesion to the wire and moreover achieves an almost perfect uniformity of lubrication while rendering contamination of the atmosphere negligible, accomplishing this result with greater simplicity, less expense, and more expeditiously than has been possible by any prior methods.

It is furthermore important to note that the lubricated surface is left perfectly dry as soon as adhering water evaporates, thus eliminating attraction of dust and grit to the lubricated face, as where oils or greases are employed.

While the invention has been illustrated as applied to lubrication of a current-distributing trolley wire, it is to be understood that tread faces of current-distributing rails or tramway cables may likewise be advantageously lubricated by the described method.

It is further to be noted that the graphited surface of the treated wire, cable or rail acquires a much greater resistance to accumulations of sleet in cold weather, and that consequently it may be desirable, during freezing weather, to spray the upper as well as under surfaces of conductors and cables.

While it is apparent that the illustrated embodiment of my invention is well calculated to adequately fulfill the objects and advantages primarily stated, it is to be understood that the invention is susceptible to variation, modification and change within the spirit and scope of the subjoined claims.

What I claim is:

1. In a lubricating apparatus, a container for a lubricant and a liquid suspending said lubricant, a spray nozzle, a delivery connection from said container to said nozzle, a second container mounted at a level above the first named container, a delivery connection from the second to the first named container, a valve controlling said connection, a pan mounted below said nozzle for catching the excess lubricant delivered therefrom, and a delivery connection from said pan to the second tank.

2. In a lubricating apparatus, the combination with a trolley pole and trolley wire, of a contact-maker, terminally carried by said pole and engaging said wire, a nozzle directed toward said wire, a drip pan below said nozzle, means for supporting said pan and nozzle upon the pole, and means for delivering a lubricant to said nozzle.

3. In a lubricating apparatus, a lubricant storage tank, means for delivering lubricant from said tank to a point of use, means for imposing air pressure on the contents of said tank to effect such delivery of its contents, a second tank mounted at a level above the first tank, means for returning excess lubricant to said second tank from the point of use, and means for regulably establishing a gravity flow from the second to the first named tank.

4. In a lubricating apparatus, the combination with a vehicle, a trolley wire, a contact maker engaging said trolley wire, and a support for said contact maker, rising from said vehicle, of a lubricant container carried by said vehicle, a lubricant delivery nozzle carried by said support and directed toward said trolley wire, a flexible delivery connection from said container to said nozzle, means for inducing a flow through said connection, a receiver for excess lubricant carried by said support, and a flexible connection from said receiver to said container for the return of excess lubricant.

5. A lubricating apparatus comprising a current collector to engage a trolley wire, a spray gun having a passage therethrough, a support for the collector, means to mount the gun on the support in predetermined relation to the collector and wire, a receptacle for a fluid positioned at a distance from the gun, a conductor from the receptacle to the gun to conduct fluid thereto and means to supply air pressure to the receptacle to force the fluid material to and through the said passage and onto the wire.

6. A lubricating apparatus comprising a current collector to engage a trolley wire, a spray gun having a passage therethrough, a support for the collector, means to mount the gun on the support in predetermined relation to the collector and wire, a receptacle for a fluid positioned at a distance from the gun, a conductor from the receptacle to the gun to conduct fluid thereto, and means to force the fluid material from the receptacle to and through the said passage and onto the wire.

CLARENCE G. WEHRLY.